Jan. 17, 1961        L. C. NEUFELD        2,968,058
COORDINATOR DEVICE FOR WINDSHIELD CLEARING SYSTEM
Filed May 19, 1958        2 Sheets-Sheet 1
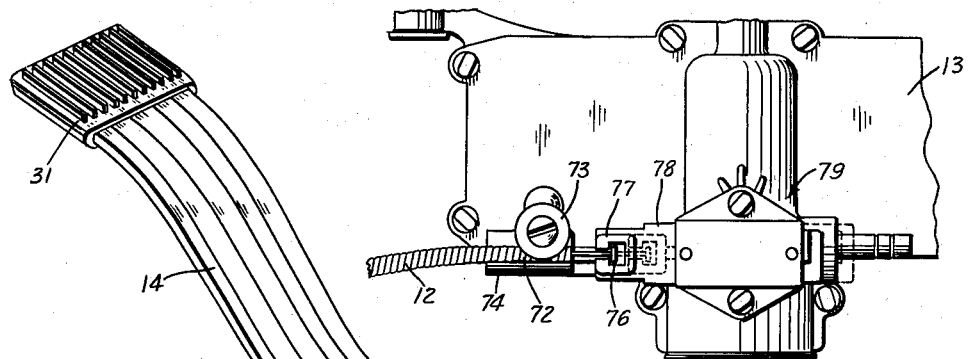
*Fig. 2*
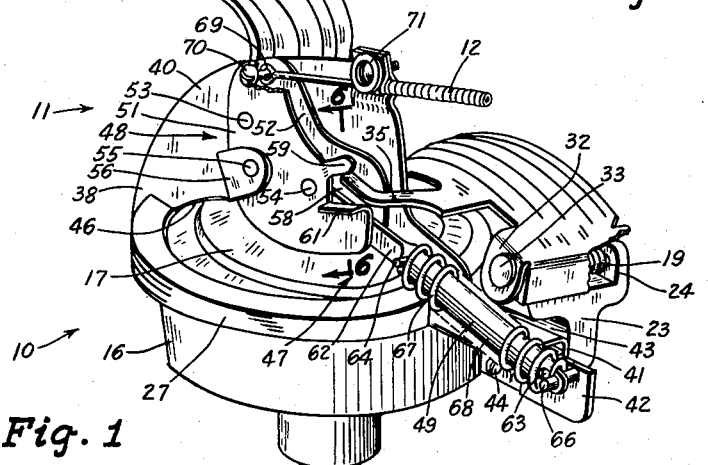
*Fig. 1*
*Fig. 3*
INVENTOR.
LEONARD C. NEUFELD
BY
Sowell & Henderson
ATTORNEY Jan. 17, 1961  L. C. NEUFELD  2,968,058
COORDINATOR DEVICE FOR WINDSHIELD CLEARING SYSTEM
Filed May 19, 1958  2 Sheets-Sheet 2

INVENTOR.
LEONARD C. NEUFELD
BY Sowell + Henderson
ATTORNEY 2,968,058
Patented Jan. 17, 1961

2,968,058
COORDINATOR DEVICE FOR WINDSHIELD CLEARING SYSTEM

Leonard C. Neufeld, Des Moines, Iowa, assignor to The Delman Company, Cookeville, Tenn., a corporation of Tennessee Filed May 19, 1958, Ser. No. 736,078

5 Claims. (Cl. 15—250.02)

This invention relates to a vehicle windshield clearing system which embodies a washer unit including a lever operated fluid pump assembly adapted for foot actuation by the operator, and a wiper unit including a conventional suction operated wiper motor. More particularly, the invention relates to a means for transmitting the operative movement of the pump assembly to the wiper motor for coordinated control therebetween.

It is an object of this invention, therefore, to provide an improved windshield clearing system for a vehicle.

A further object of this invention is to provide in a windshield clearing system embodying a foot operated fluid pump assembly and a suction type wiper motor, a simple and economical device adapted to transmit the operative movement of the pump assembly to the wiper motor for an effective and positive control of the wiper motor operation relative to the pump assembly operation.

Another object of this invention is to provide a coordinated control between a manually operated pump assembly and a suction operated wiper motor such that the motor is positively started and stopped in response to the actuation and de-actuation of the pump assembly.

Other objects and advantages will become readily apparent by reference to the following description and the accompanying drawings, wherein:

Fig. 1 is a perspective view of a foot operated fluid pump assembly adapted for particular use in an automotive windshield clearing system and to which is assembled an embodiment of the present invention;

Fig. 2 is a top plan view of a vacuum type wiper motor to which the invention of Fig. 1 is operatively connected;

Figs. 3 and 4 are fragmentary side elevational views of the assembly of Fig. 1, and showing the relationship and position of the various parts at two different operative positions of the pump assembly;

Figure 4:
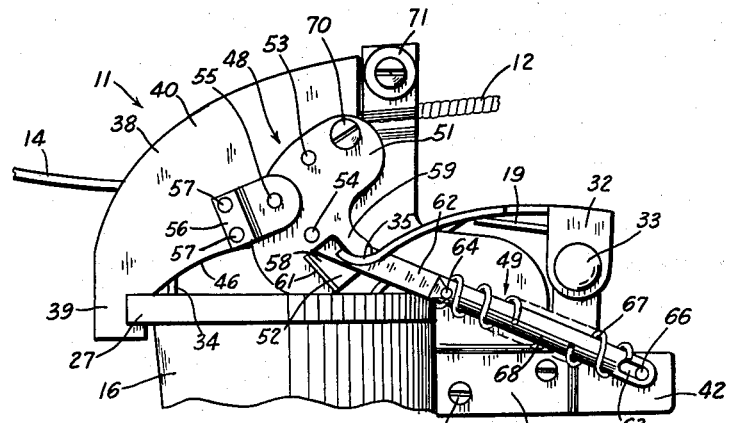

Referring to the drawings, a fluid pump assembly, indicated generally at 10 (Fig. 1) has mounted thereon a mechanical actuating device 11 adapted for connection to one end of a Bowden wire unit 12. The other end of the unit 12 is operatively connected to a windshield wiper motor 13 (Fig. 2). As will be described in detail hereinafter, this arrangement is the basis for a regulated or coordinated control of the wiper motor 13 relative to the operation of the pump assembly 10.

The pump assembly 10 is of a type adapted for particular use in an automotive windshield clearing system (not shown) wherein the pump is mounted on the floorboard and interconnected between a fluid reservoir and a discharge device. The normal operation of the pump is such that upon a downward movement of a lever member 14 due to foot pressure, fluid is forced from the pump 10 to the discharge device for ejection to the windshield of the vehicle into the path of movement of a usual windshield wiper (not shown). Then, upon a release of the lever member 14, fluid is drawn into the pump 10 from the reservoir thus readying the pump for the next cycle.

Figure 5:
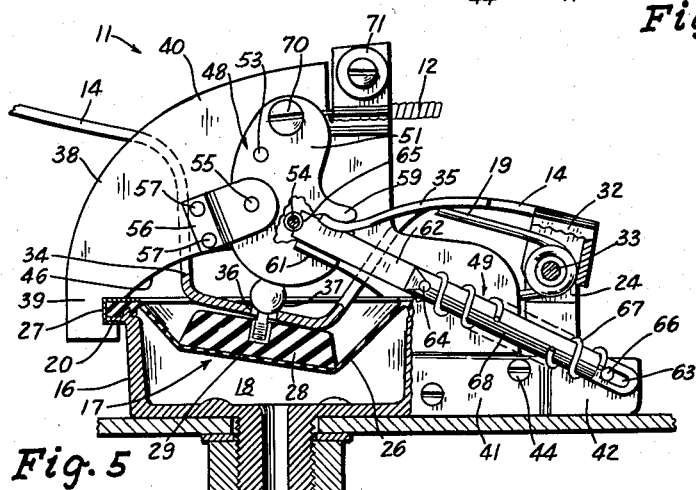
Fig. 5 is a view similar to Figs. 3 and 4 showing the pump assembly in still another operative position, including additionally certain parts shown in section and broken away for the purpose of clarity.
Figure 6:
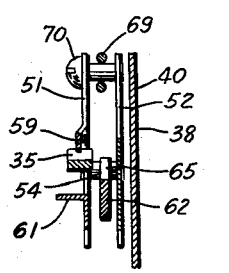
Fig. 6 is a sectional view taken on the line 6—6 of Fig. 1.

Referring now particularly to Figs. 1 and 5, the pump assembly 10 consists generally of a body unit 16 and a flexible diaphragm unit 17 secured to the top of the body unit 16 to form therewith a fluid tight pump chamber 18. The lever member 14 is pivotally secured to the body unit 16 and is also operatively connected to the diaphragm unit 17, a biasing spring 19 being arranged to maintain the lever member 14 in a normal or rest position.

The body unit 16 is cast in one piece and includes an annular rim 20 (Fig. 5) at the top of the chamber 18 and a hollow stem section 21 depending centrally from the chamber 18. A bore 22 formed in the stem section 21 constitutes a fluid passage whereby fluid may enter and leave the chamber 18. A portion 23 (Fig. 1) of the body unit 16 is laterally offset from the chamber 18 and includes a pair of spaced upright projections or ears 24 formed with transversely aligned openings (not shown).

The diaphragm unit 17 (Fig. 5) is comprised of elastic material and includes a relatively thin bottom membrane 26 which closes the top of the fluid chamber 18 and is held in a fluid tight relation thereover by a clamp member 27 secured to the rim 20. A thick annular center section 28 is bonded at its lower surface to a central portion of the membrane 26 and includes a threaded molded insert 29. The diameter of the section 28 is such that it is movable downwardly into the confines of the fluid chamber 18.

The lever member 14 includes a rubber pad 31 secured to its free end. The other end of the member 14 terminates in a pair of transversely spaced depending ears 32 (only one of which is shown) arranged in a straddling relation with the projections 24. Openings (not shown) in the ears 32 are in alignment with the openings in the projections 24 for receiving a pivot pin 33 whereby to pivotally connect the lever member 14 to the body 16. A portion 34 of the lever member 14 intermediate its ends is of a U-shape in longitudinal cross section, the portion 34 also being adapted to move downwardly into the confines of the chamber 18. A curved finger 35 is formed along one side of the lever member 14 for a purpose to appear hereinafter. Extended longitudinally of the portion 34 is a slot 36 through which a round headed nut 37 is inserted for threaded engagement in the insert 29, whereby to movably connect the diaphragm unit 17 to the lever member 14.

By arranging the torsion spring 19 in a conventional manner about the pivot pin 33, the spring 19 biases the lever member 14 in a direction, best shown in Fig. 1, wherein the U-shaped portion 34 of the lever member maintains the diaphragm unit 17 at a raised position relative to the fluid chamber 18. In this position of the lever member 14, the pump assembly 10 is inoperative.

The actuating device 11 (Figs. 1 and 3) comprises a unitary, substantially flat mounting plate 38 which has a hooked portion 39 at one end, a central portion 40, and a mounting portion 41 formed at its other end. An extended portion 42 is offset laterally from the mounting portion 41. The mounting plate 38 is secured to the pump assembly 10 by connecting the hooked portion 39 to the clamp member 27 at one location thereon, and by attaching the mounting portion 41 to one side 43 of the body offset portion 23, as by screws 44. By this arrangement, a lower arcuate side 46 of the central portion 40 is spaced above the diaphragm unit 17, and the mounting plate 38 is spaced laterally from the lever member 14. Of note, the mounting plate 38 lies in a plane which is substantially parallel to the plane of movement of the lever member 14, for a purpose to appear hereinafter.

A toggle unit 47 is pivotally connected to the mounting plate 38 and includes an upper link 48 and a lower link 49. The upper link 48 includes a pair of relatively flat, kidney shaped outer and inner elements 51 and 52. These elements are secured in a laterally spaced, parallel manner by a first pin 53 and by a second or knee pin 54 which is approximately centrally located in both elements 51 and 52. The upper link 48 is pivotally connected as a unit to the mounting plate 38 by a pivot pin 55 which is rotatably mounted through the link 48 and a pivot forming member 56, the latter being secured to the mounting plate 38 by means of rivets 57 (Fig. 3). The elements 51 and 52 are similar in all respects, with the exception that the outer element 51 is provided with a cutout space 58 formed between an upper projection 59 and a lower, shelf forming projection 61. Both projections 59 and 61 are integral with the element 51. The finger 35 of the lever member 14 is adapted to be inserted in the cutout 58 and between the projections 59 and 61 for a purpose to appear hereinafter.

The lower link 49 is rod-like in form having one end 62 flattened and its other end provided with a longitudinally extended slot 63. A pin 64 extends from one side of the link 49 intermediate the ends thereof to form a shoulder, and the free end of the flattened portion 62 is arcuately notched at 65. When assembled, the arcuately notched end 65 of the lower link 49 contacts the knee pin 54 (Fig. 5) of the upper link 48 and the slot 63 of the lower link 49 is mounted on a projection 66 which is extended outwardly from the extended portion 42 of the mounting plate 38.

Of importance, the knee pin 54, the pivot pin 55, and the projection 66 all extend in a direction substantially normal to the plane of movement of the lever member 14. Also, the knee pin 54 is arranged intermediate the pivot pin 55 of the upper link 48 and the projection 66 for the lower link 49, whereby, upon relative movement of the links 48 and 49 about their respective pivots, the knee pin 54 is movable through a dead center position between the pivot pin 55 and the projection 66.

In order to bias the toggle unit 47 away from and to each side of the dead center position of the knee pin 54, a coil spring 67 is arranged between the projection 66 and the pin 64 on the lower link 49, the spring being mounted about the tubular intermediate portion 68 of the lower link 49.

For the purpose of interconnecting the actuating device 11 with the wiper motor 13, one operative end 69 (Fig. 1) of the Bowden wire unit 12 is pivotally connected to a pin member 70 secured between the elements 51 and 52 of the upper link 48 at the upper end thereof. The unit 12 is securely held to the mounting plate 38 by a clamping unit 71. The opposite end 72 (Fig. 2) of the Bowden wire unit 12 is secured as by a clamping device 73 to a stand 74 integral with the motor 13, whereby a bead 76 extended from the end 72 is insertable in a slotted portion 77 of a reciprocally movable slide member 78 which is part of a control valve 79 for the wiper motor 13.

The control valve 79, shown only in plan in Fig. 2, is a conventional two position valve comprising essentially a plurality of ports and the slide member 78 which is adapted in alternate positions to cover and/or uncover various of the ports for the proper transmission and direction of the suction pressure received in the motor 13 from the intake manifold of the vehicle engine (not shown). For the purpose of this invention, let it be assumed that when the slide member 78 is in the protruded position as shown by the full lines of Fig. 2, the wiper motor 13 is inoperative and when the slide member 78 is in the inwardly moved position as shown by the dotted lines of Fig. 2, the wiper motor 13 is operative. Of importance, as is the case with any valve of this type wherein there is a transition period during the movement of the slide member 78 when various ports are partially covered or uncovered, such transition period should be as short as possible. With regard particularly to the turning off of the wiper motor, should the transition period, especially in its final stages, be too long, a stalling of the wiper blades could occur.

In the operation of the windshield clearing system, the washer unit is inoperative when the pump assembly 10 is in the position best shown in Fig. 1. In this position of the pump assembly, the lever member 14 is in a raised position due to the bias of the torsion spring 19 and the diaphragm unit 17 is also raised to provide for the fluid chamber 18 having its greatest capacity for the fluid therein.

By virtue of the position of the lever member finger 35 and its operative engagement with the upper projection 59, the upper link 48 has been moved in a counterclockwise manner about its pivot 55 to where the bias of the spring 67 is such that the lower link 49 is fully extended as provided by the slot 63, the stationary projection 66 being located at the lower end of the slot 63. By this arrangement, the knee pin 54 is located above its dead center position between the pivot pin 55 and the projection 66.

Additionally, the location of the upper link 48 is such that the wire unit end 72 is spaced its greatest distance from the wiper motor 13 whereby the bead 76 and the control valve slide member 77 are in the position indicated by the full lines in Fig. 2. In this position of the slide member, the control valve 79 prevents the wiper motor from operating.

To place the system into operation, the lever member 14 is depressed and begins a downward pivotal movement about its pivot pin 33. Referring to Fig. 3, the downward pivotal movement of the lever member is transmitted by the lever finger 35 engaging the lower projection 61 of the upper link's outer element 51, whereby the upper link 48 is pivotally moved in a clockwise direction as viewed in Fig. 3 about its pivot pin 55 until the knee pin 54 is directly on dead center. The lower link 49 is thus forced downwardly by the knee pin 54 against the compression of the spring 67.

The clockwise movement (Fig. 3) of the upper link 48 in turn forces the wire portion 72 of the Bowden wire unit 12 toward the right (Fig. 2) whereby the control valve 79 is actuated sufficiently to permit operation of the wiper motor 13.

Concurrent with the wiper motor operation, the downward movement of the lever member 14 operates through the connection of the U-shaped portion 34 with the flexible diaphragm unit 17 to force part of the fluid in the chamber 18 outwardly through the bore 22. It is seen, therefore, that at the operative position of the pump assembly 10 in Fig. 3, fluid is discharged, and the wiper motor 13 is operated, due to the transmission of the operative movement of the lever member 14 by the actuating device 11 and the Bowden wire unit 12 to the control valve 79.

Upon further downward movement of the foot lever 14, it may readily be seen that as soon as the finger 35 has pivotally moved the upper link 48 to where the knee pin 54 is slightly over or below its dead center position, the compression of the spring 67 acting on the lower link 49 is released whereby a snap action of the toggle unit 47 occurs. As a result of this snap action, the upper link 48, as best shown in Fig. 4, completes its clockwise movement thus effectuating via the wire unit 12 a fast movement of the slide member 79 for a positive setting of the control valve 79 to admit full suction power to the wiper motor.

Also as a result of the snap action of the toggle unit 47, the lower link 49 is forced to the left (Fig. 3) by the spring 67 until the projection pin 66 again contacts the right or the lower end of the slot 63. Although the turning on of the wiper motor 13 is completed at this point, the lever member 14 may continue to be depressed so that the pump continues to emit fluid, until the lever portion 34 is bottomed in the chamber 18 or until the lever finger 35 strikes the lower projection 61 formed on the upper link 48 (Fig. 4).

Upon a release of the foot lever member 14 the bias of the torsion spring 19 (Fig. 5) forces the lever member upwardly about its pivot pin 33. This movement lifts the diaphragm unit 17 from its depressed position within the chamber 18 and effects a withdrawal of fluid from the fluid reservoir (not shown) through the stem section bore 22 and into the chamber 18. Consequently, the pump assembly 10 is ready to recycle.

Concurrently with the upward movement of the lever member 14, the lever finger 35 re-engages the upper projection 59 and pivotally moves the upper link 48 in a counterclockwise direction as viewed in Fig. 5 until the knee pin 54 is again on dead center. This movement of the upper link is transmitted by the Bowden wire 72 to the slide valve member 78 whereby the member 78 is pulled outwardly or to the left (Fig. 2) in a manner to de-actuate the wiper motor 13. Further movement of the lever member 14 rotates, via the finger 35, the knee pin 54 across or above its dead center position and again permits the compression of the spring 67 to snap the toggle unit 47 back into the original position of Fig. 1. Here again, the accelerated counterclockwise movement of the upper link 48 results in an equally accelerated movement of the slide member 78 in completing its stroke, thus ensuring a positive shutting off of the wiper motor operation so as to eliminate any stalling of the wiper blade. As was the case with the downward movement of the lever member 14, after the toggle unit action during the upward movement, the lever member 14 continues to move upwardly until the finger 35 strikes the upper projection 59.

It is thus seen that by the structural arrangement of the actuating device 11 and its operative association with the pump assembly 10 and the wiper motor 13, the operation of the pump assembly 10 and the wiper motor 13 and thus the washer and wiper units of which they are a part, is coordinated by translating and transmitting the pivotal movement of the lever member 14 to a reciprocal movement of the control valve slide member 78.

Of note, although the description and the drawings necessarily elaborate on the various positions of the lever member 14 and the toggle unit 47 as though their movement is erratic; in actual use, such movement of both elements is at a rather constant rate in both directions.

Although only one preferred embodiment of the invention has been disclosed and described herein, various modifications and alternate constructions may be made without varying from the full scope of the invention as defined in the appended claims.

I claim:

1. An actuating device for a windshield clearing system including a wiper unit and a washer unit, the wiper unit including a wiper motor and a reciprocally movable valve member for controlling the operation of said wiper motor, the washer unit including a fluid pump assembly having an operator operated, pivotally mounted lever member adapted upon oscillatory movement to alternately cause said pump assembly to emit fluid therefrom; said actuating device comprising, a toggle joint the ends of which are pivotally mounted on said pump assembly and the knee portion of which is movable through a dead center, a finger element extended from said lever member, said toggle joint operatively engageable by said finger element whereby to move said knee portion back and forth through the dead center upon the said oscillatory movement of said lever member, means anchored on said pump assembly and connected to said toggle joint for biasing said knee portion away from dead center, and motion transmitting means interconnecting said toggle joint with said valve member.

2. An actuating device for a windshield clearing system including a wiper unit and a washer unit, the wiper unit including a wiper motor and a reciprocally movable valve member for controlling the operation of said wiper motor, the washer unit including a fluid pump assembly having an operator operated, pivotally mounted lever member adapted upon oscillatory movement to alternately cause said pump assembly to emit fluid therefrom; said actuating device comprising, a toggle joint having a pair of link members, a first link member pivotally connected to said pump assembly, said pump assembly having a projecting pin element, the second link member having a slotted end in which said pin element is inserted, said link members pivotally connected at a knee portion, one of said link members operatively connected to said lever member whereby oscillatory movement of said lever member causes reciprocal movement of said knee portion through a dead center, spring means anchored at one end to said pin element and at the other end to said second link member whereby to bias said toggle link away from dead center, and motion transmitting means interconnecting one of said link members to said valve member.

3. An actuating device for a windshield clearing system including a wiper unit and a washer unit, the wiper unit including a wiper motor and a reciprocally movable valve member for controlling the operation of said wiper motor, the washer unit including a fluid pump assembly having an operator operated, pivotally mounted lever member adapted upon oscillatory movement to alternately cause said pump assembly to emit fluid therefrom; said actuating device comprising, a toggle joint having a pair of link members, a first link member pivotally connected to said pump assembly, said pump assembly having a projecting pin element, the second link member being an elongated rod having a longitudinally extended slot formed in one end thereof in which said pin element is inserted, a coil spring surrounding said second link member and arranged between said pin element and a shoulder formed on said second link member whereby said second link member is biased longitudinally away from said pin element, said link members pivotally connected together at a knee portion, one of said link members engageable by said lever member whereby oscillatory movement of said lever member causes reciprocal movement of said knee portion through a dead center, and motion transmitting means interconnecting said first link member to said wiper motor valve member, whereby oscillatory movement of said lever member is translated into reciprocal movement of said valve member.

4. In combination, a lever actuated fluid pump and an actuating means operatively engaged with said pump for transmitting motion upon operation of said pump, said fluid pump including a fluid containing pump body, a lever member pivotally connected to said body and adapted for depressing movement to a position whereby to cause said pump to emit fluid therefrom, a finger portion extended from said lever member, and flexible means arranged between said pump body and said lever member whereby to bias said lever member upwardly from said depressed position to a position wherein said pump is inoperative, said actuating means comprising a bracket element securely attached to said pump body, a first link member comprising a pair of plates secured to each other by at least one pin in a spaced, parallel manner, a pivot pin secured to said bracket element for pivotally mounting said first link member thereto, said one pin and said pivot pin extended parallel to each other and normal to the plane of movement of said lever member, a second link member comprising an elongated rod with a shoulder portion formed thereon pivotally connected at one end to said one pin and having a longitudinally extended slot formed in the other end, said first link member operatively engageable by said finger portions, a pin element projecting from said bracket element in a direction parallel with said pivot pin and inserted through said slot, the arrangement such that said one pin, pivot pin and pin element lie in a common plane whereby the one pin is movable back and forth through a dead center intermediate to said pivot pin and pin element, and flexible means arranged between said pin element and said shoulder portion and biasing said second link member toward said one pin, said second link member adapted for attachment thereto of a motion transmitting device.

5. In combination, a lever actuated fluid pump and an actuating means operatively engaged with said pump for transmission motion upon operation of said pump, said fluid pump including a fluid containing pump body, a lever member having a finger portion and pivotally connected to said pump body, said lever member operatively associated with said pump body whereby a depressing movement of said lever member toward said body results in an emission of fluid therefrom, spring means arranged at the pivotal connection for biasing said lever member upward from the depressed position to an inactive position said actuating means comprising a bracket securely attached to said pump body, a pair of pin elements mounted in spaced relation on said bracket and extended in parallel directions normal to the plane of movement of said lever member, a toggle joint device including two link members each of which is pivotally connected at their free end to one of said pin elements, the joint between said link members movable through a dead center whereby said toggle joint device is movable through a plane parallel with the plane of movement of said lever member, the first link member having a pair of spaced flanged portions between which said finger portion extends for alternate contact with each flanged portion, said flanged portions being spaced in the direction of movement of said finger portion, the second link member having a shoulder formed thereon, and spring means arranged between one of said pin elements and said shoulder whereby to bias said toggle joint device away from dead center, said first link member adapted for attachment thereto of a motion transmitting device.

References Cited in the file of this patent

UNITED STATES PATENTS

| | | |
|---|---|---|
| 2,670,720 | Bitzer | Mar. 2, 1954 |
| 2,784,602 | Sprow | Mar. 12, 1957 |
| 2,844,102 | Oishei | July 22, 1958 |
| 2,873,467 | Oishei | Feb. 17, 1959 |

FOREIGN PATENTS

| | | |
|---|---|---|
| 1,069,263 | France | July 6, 1954 |